US006762222B2

(12) United States Patent
Scholl et al.

(10) Patent No.: US 6,762,222 B2
(45) Date of Patent: Jul. 13, 2004

(54) AMINO RESIN MIXTURE FOR PRODUCING FOILS AND ENDINGS WITH REDUCED FORMALDEHYDE ELIMINATION

(75) Inventors: Frank Scholl, Bad Homburg (DE); Johann Wonner, Rodgau (DE); Gerald Hobisch, Graz (AT)

(73) Assignee: Solutia Germany GmbH & Co. KG (DE)

( * ) Notice: Subject to any disclaimer, the term of this patent is extended or adjusted under 35 U.S.C. 154(b) by 456 days.

(21) Appl. No.: 09/847,478

(22) Filed: May 2, 2001

(65) Prior Publication Data

US 2001/0051679 A1 Dec. 13, 2001

(30) Foreign Application Priority Data

May 5, 2000 (DE) .......................................... 100 21 849

(51) Int. Cl.[7] .................................................. C08L 5/00
(52) U.S. Cl. ............................ 524/27; 524/56; 524/58; 524/241
(58) Field of Search ............................. 524/27, 56, 58, 524/241

(56) References Cited

U.S. PATENT DOCUMENTS 5,223,323 A * 6/1993 Dickerhof et al. .......... 428/143

FOREIGN PATENT DOCUMENTS

| DE | A 23 09 334 | 2/1973 | |
|---|---|---|---|
| DE | A 34 03 136 | 1/1984 | |
| DE | 39 05 268 A1 | 8/1990 | ......... C09D/161/28 |
| DE | A 44 39 156 | 11/1994 | |
| DE | A 38 37 965 | 11/1998 | |
| DE | 198 61 030 A1 | 5/2000 | ............ C09D/5/03 |
| EP | 0 038 408 A2 | 10/1981 | ........... C08L/97/02 |
| WO | WO 88/06176 A1 | 8/1988 | ............ C09D/3/81 |

OTHER PUBLICATIONS

Kunststoff–Handbuch vol. 10 Duroplaste (Thermosets), Hanser–Verlag, $2^{nd}$ Ed. 1988p. 462 f., pp 477–479.

* cited by examiner

Primary Examiner—Edward J. Cain
(74) Attorney, Agent, or Firm—Connolly Bove Lodge & Hutz LLP

(57) ABSTRACT

Aqueous amino resin compositions comprising amino resins A, formaldehyde-binding additives (auxiliaries) B, which may include hydroxyl-containing polyurethanes B13, acrylic resins C, if desired, in the form of aqueous dispersions, and water, and their use as impregnating compositions for paper for the purpose of producing finished foils and edgings.

11 Claims, No Drawings

AMINO RESIN MIXTURE FOR PRODUCING FOILS AND ENDINGS WITH REDUCED FORMALDEHYDE ELIMINATION

FIELD OF THE INVENTION

The present invention relates to aqueous, heat-curable amino resin mixtures based on etherified amino resins and formaldehyde-binding auxiliaries and to their use for impregnating papers and cardboard.

BACKGROUND OF THE INVENTION

Surfaces and narrow faces of woodbase materials are coated using coated foils (finished foils) and, respectively, impregnated cardboard (Kunststoff-Handbuch Vol. 10 *Duroplaste* [Thermosets], Hanser-Verlag, 2nd Ed. 1988, p. 462 f., pp. 477 to 479). For the production of finished foils (to coat surfaces) and finished edgings (to coat narrow faces, of boards in particular), absorbent papers are impregnated with solutions or dispersions of (thermosetting) amino resins such as urea-formaldehyde and/or melamine-formaldehyde resins, for example, alone or in combination with dispersions of thermoplastics such as acrylic dispersions or styrene-acrylic dispersions, dried in a stream of hot air and simultaneously cured, and then coated.

In order to ensure adequate penetration of the impregnation liquors into the paper or cardboard, the resin solutions must be processed from aqueous or alcohol dilution. Owing to the high level of cellulose swelling in aqueous systems, the foils and edgings produced from high aqueous dilution are brittle, exhibit a high level of water absorption, and even in the coated state have a surface whose visual appeal is low. The procedure described in DE-A 23 09 334, comprising impregnating liquors diluted with $C_1$ to $C_4$ alcohols, does give foils and edgings having good performance properties but requires complex measures for reprocessing the waste gas. The route to a solution that is described in DE-A 44 39 156, modifying melamine resins with guanamines, makes it possible to carry out impregnation from purely aqueous impregnating liquors. A disadvantage, however, is the significantly higher cost of the amino resin, resulting from the use of the guanamines.

The formaldehyde emissions of finished foils and edgings after manufacturing are determined following storage under standard climatic conditions (23° C., 50% relative atmospheric humidity) in accordance with the standard EN 717-2 (FESYP method, gas analysis). Foils and edgings with values of less than 3.6 mg/(h·m$^2$) by the FESYP method meet the limit of the standard ("E 1"). The rates of emission found remain more or less constant even after several weeks of storage under standard climatic conditions. Formaldehyde emissions observed on the films and edgings arise due to the use of urea-formaldehyde and/or melamine-formaldehyde resins in the impregnating liquors for impregnating the paper or cardboard sheets and/or in the coating formulations for coating the films and edgings. By using particularly low-formaldehyde urea-formaldehyde and/or melamine-formaldehyde resins (with low formaldehyde clearage) it is possible to reduce the formaldehyde emissions as measured by the FESYP method (standard climatic conditions) to values around 2 mg/(h·m$^2$).

It has surprisingly now been found that when edgings produced in accordance with the prior art and originally (before the commencement of storage) satisfying the classification E1 ("E1 edgings"), with initial formaldehyde emission values of from 1.0 to 3.5 mg/(h·m$^2$), are stored under nonstandardized climatic conditions, at customary summer temperatures and atmospheric humidities, the formaldehyde emissions rise in the course of a few weeks to values of in some cases much higher than 3.5 mg/(h·m$^2$), and so the edgings no longer meet the E1 criterion. This unexpectedly high increase in the formaldehyde emissions was confirmed by storage under defined conditions in a tropical climate (35° C., 90% relative atmospheric humidity), with measurement being carried out only after 3-day reconditioning under standard climatic conditions following storage under the tropical climatic conditions.

From the prior art it is known that the amount of free formaldehyde and also the formaldehyde emissions may be reduced by adding formaldehyde scavengers such as urea and urea derivatives, for example. For instance, according to DE-A 38 37 965, finished foils and edgings with formaldehyde emissions that are negligible as determined in accordance with DIN 52368 may be produced by adding urea to the melamine-formaldehyde condensation product. Regarding the behavior during and after storage under tropical climatic conditions, however, no information is given. According to DE-A 34 03 136, mixtures of organic hydroxy compounds and an amide are suitable for use as formaldehyde-binding agents in boards made from wood cellulose materials. The use of these mixtures as formaldehyde scavengers in finished foils and edgings is not described. The addition of the mixtures described in DE-A 34 03 136 to amino resins that are used to produce finished foils and edgings leads to a marked deterioration in the flexibility of the finished foils and edgings produced with them. The use of formaldehyde scavengers known from the literature, such as urea, ethyleneurea and propyleneurea, resulted in finished foils and edgings which met the E1 criterion under standard climatic conditions but which markedly exceed the E1 limit of 3.5 mg/(h·m$^2$) under tropical climatic conditions.

It is therefore an object of the present invention to develop amino resin mixtures for producing films and edgings, which can be used to produce, relative to the prior art, finished foils and furniture edgings with significantly reduced formaldehyde emission when stored under tropical climatic conditions, while retaining the required performance properties.

SUMMARY OF THE INVENTION

The invention provides aqueous amino resin compositions comprising amino resins A, formaldehyde-binding additives (auxiliaries) B, which may comprise hydroxyl group-containing polyurethanes B13, and, if desired, acrylic resins C in the form of aqueous dispersions, and water.

DETAILED DESCRIPTION OF THE INVENTION

Where the component B consists only of at least one organic hydroxyl compound which is soluble in water or a monohydric alcohol having 1 to 4 carbon atoms and is selected from dihydric, trihydric and pentahydric alcohols containing up to 6 carbon atoms, pentaerythritol and sorbitol, monosaccharides containing up to 6 carbon atoms, disaccharides containing up to 12 carbon atoms, polysaccharides having an Ostwald viscosity of up to 200 mPa·s at 25° C. and a concentration corresponding to 37% refraction, monohydric and polyhydric aromatic alcohols containing only one benzene ring, and monohydric and polyhydric phenols, and of at least one amide which is soluble in water or a monohydric alcohol having 1 to 4 carbon atoms and is selected from aliphatic amides containing up to 6 carbon atoms and aromatic amides containing only one benzene ring, the presence of at least one of the components B13 and C in the composition is mandatory.

The amino resins A are water-soluble melamine resins, urea resins or mixed melamine-urea condensates which are etherified with $C_1$ to $C_4$ alcohols. In the compositions of the invention it is also possible to use those melamine resins in which a fraction (up to 20% of its mass) of the melamine has been replaced by other triazines such as acetoguanamine, caprino-guanamine or benzoguanamine. Preferred resins, however, contain less than 10%, in particular less than 5%, of other triazines, measured on the same scale. Particular preference is given to straight melamine resins or to their cocondensates with urea. The resins are etherified at least partially with the abovementioned alcohols, especially methanol, n-butanol and isobutanol. Particular preference is given to methanol-etherified amino resins.

Particular preference is given above all to melamine resins having an amount-of-substance ratio (molar ratio) of melamine to urea to formaldehyde to methanol of 1 mol: (0 to 2 mol):(1.8 to 5.8 mol):(0.8 to 5.5 mol).

The preparation of the amino resins A is widely known. First of all, methylolation and condensation are carried out by adding formaldehyde to the amino resin formers at pH values from 7 to 10 and temperatures from 40 to 110° C., after which the etherifying alcohol is added and reaction is continued at pH values from 1 to 7 and temperatures from 30 to 80° C. The condensation conditions and etherification conditions are guided by the water dilutability desired for the resin, which amounts to at least 1 part by weight of resin to 5 parts by weight of deionized water, and by the required penetration properties.

As component B, formaldehyde-binding auxiliaries are added. These auxiliaries are selected from mixtures B1 of organic amides B11 having up to 10 carbon atoms and from one to four nitrogen atoms attached in amidelike or imide-like manner, such as urea and/or urea derivatives such as thiourea, ethyleneurea (2-imidazolidinone), propyleneurea, acetyleneurea (glycoluril), and also formamide, acetamide, benzamide, oxalamide, succinimide, malonamide and dicyandiamide, and polyhydroxyl compounds B12 selected from aliphatic linear and branched compounds B121 having from 2 to 6 hydroxyl groups and 1 to 10 carbon atoms, such as glycol, 1,2- and 1,3-propylene glycol, neopentyl glycol, glycerol, trimethylolpropane, ditrimethylolpropane, erythritol, pentaerythritol, dipentaerythritol, sorbitol and mannitol, monosaccharides B122 having up to 6 carbon atoms, and disaccharides B123 having up to 12 carbon atoms, and, if desired, water-soluble or water-dispersible, hydroxyl-containing urethane compounds B13. These urethane compounds are of low mol mass (number-average molar mass $M_n$ from 150 to 5000 g/mol, preferably from 300 to 4000 g/mol) and contain hydrophilic groups which are preferably nonionic, especially building blocks derived from glycol or from oligoethylene or polyethylene glycol. Examples of suitable compounds are adducts of aliphatic linear or cyclic diisocyanates, such as 1,2-diisocyanatoethane and 1,6-diisocyanatohexane, with ethylene glycol, diethylene glycol or mixtures thereof with 1,2- or 1,3-propylene glycol, these latter hydrophobic diols being used only in fractions (e.g., less than 25% of the mass of diols overall) such that the adduct remains soluble or dispersible, respectively, in water.

Likewise suitable as formaldehyde-binding component B2 are reaction products containing urethane groups, said products being obtained by reacting polyhydroxyl compounds B21, including the compounds mentioned under B12 and also aliphatic polyhydroxy amines B211 having from 2 to 6 hydroxyl groups and 1 to 4 nitrogen atoms, attached in an aminelike manner, per molecule and containing no free amine-type hydrogen atoms, such as N-methyldiethanolamine, N,N,N',N'-tetrakis(2-hydroxyethyl) ethylenediamine and triethanolamine with monofunctional or polyfunctional aliphatic, cycloaliphatic or aromatic isocyanates B22, such as hexamethylene diisocyanate, for example.

The addition of formaldehyde-binding auxiliary B (calculated by mass without solvents or diluents, i.e., on a 100% basis) amounts to from 2 to 50 parts by weight per 100 parts by weight of amino resin (likewise on a 100% basis). In addition to the reduction in formaldehyde, it is also found when using a reaction product of hydroxy amines and diisocyanate, such as the reaction product of triethanolamine with hexamethylene diisocyanate in Example 11, that the pot life is extended significantly.

The acrylic resin dispersion C is a dispersion of an acrylic copolymer in water, preparable for example by emulsion copolymerization of olefinically unsaturated monomers, the monomer mixture used for its preparation comprising a predominant fraction (more than 50% of its mass) of what are known as acrylic monomers, i.e., acrylic or methacrylic acid and derivatives thereof, especially esters with aliphatic alcohols having 1 to 10 carbon atoms, esters with aliphatic polyhydroxy compounds having 2 to 10 carbon atoms and at least two hydroxyl groups per molecule, and the nitriles of said acids. Preferred acrylic monomers among the esters are methyl, ethyl, n-butyl, t-butyl, hexyl and 2-ethylhexyl (meth)acrylate, hydroxyethyl and hydroxypropyl (meth)acrylate. It is additionally possible for copolymerizable monomers such as styrene and other aromatic vinyl compounds, esters or monoesters of olefinically unsaturated dicarboxylic acids such as, in particular, maleic acid, vinyl esters such as vinyl acetate or vinyl Versatate, vinyl halides or vinyl ethers to be copolymerized. The synthetic resin dispersions usually have mass fractions of solids of from 25 to 85%; they are added to the amino resin or else to the impregnating liquor itself. The ratio of the mass of the acrylic copolymer in the acrylic dispersion to the mass of the amino resin in its aqueous solution or dispersion may within the composition be from 0 to 150:100, preferably from 20 to 140:100.

The amino resin compositions are used to impregnate absorbent papers or cardboards. The amount of amino resin composition introduced is usually such that the mass per unit area of the paper or cardboard following impregnation and subsequent drying increases by a factor of from 1.3 to 2.5, preferably from 1.4 to 1.8.

The use of the mixtures of the invention leads to a significant reduction in the formaldehyde emissions from the foils and edgings stored under tropical climatic conditions.

EXAMPLES

Preparation of a Partially Etherified Melamine-Formaldehyde (MF) Resin

A 30 l laboratory vessel with stirrer, reflux condenser and thermometer was charged with 6717 g (87.2 mol) of 39% strength aqueous formaldehyde and this initial charge was heated to 68° C. Then 31.5 ml of 2 N sodium hydroxide solution were added followed immediately by 3450 g (27.4 mol) of melamine. Because of the exothermic reaction of melamine and formaldehyde, the mixture rose in temperature to about 83° C. and was held at this temperature until all of the melamine had dissolved. It was then cooled to 55° C. and 16560 g (517 mol) of methanol and 30 ml of 53% strength nitric acid were added. The reaction mixture was heated to 59° C. and stirred at this temperature until a clear solution was formed. After a further 30 minutes, the reaction was terminated by adding about 140 ml of 2 N NaOH. The pH was adjusted to 10. Excess methanol was removed by distillation under reduced pressure (generated by a water jet pump) and the mass fraction of solids of the resin was adjusted to 75% (measured on a 2 g sample, dried at 120° C. for 1 h in a glass dish). The resin had the following characteristics: content (mass fraction of solids): 75%; viscosity at 23° C.: 480 mPa·s, mass fraction of free formaldehyde: 0.17%; water dilutability: unlimited.

Auxiliary BA: Mixture of Glycerol and Urea 100 g of urea were introduced with stirring into 100 g of glycerol and the mixture was heated to 90° C. After the urea had dissolved, it was cooled to 20° C. This gave a mixture with a pastelike consistency.

Auxiliary BB: Mixture of Glycerol, Urea and Polyurethanediol 100 g of urea and 67 g of 88% strength solution of urethanediol (number-average molar mass $M_n$ 320 g/mol, OH number 350 mg/g, urethane group content 37 cg/g) were introduced with stirring into 100 g of glycerol and the mixture was heated to 90° C. Following dissolution, the mixture was cooled to 20° C. This gave a mixture with a pastelike consistency.

Auxiliary BC: Reaction Product of Trimethylolpropane (TMP) and Hexamethylene Diisocyanate (HDI)

In a suitable reaction vessel with water separator, 100 g of TMP were melted, after which nitrogen was passed over the material at 140° C. with stirring for 3 hours in order to eliminate traces of water. The system was then cooled to 60° C. and 8 g of HDI was added slowly dropwise with vigorous stirring. The temperature was maintained until the mass fraction of isocyanate groups in the reaction product (NCO value) had fallen below 0.1%. Then the mass fraction of solids was adjusted to 85% using water. The reaction mixture was a colorless solution of low viscosity.

Auxiliary BD: Reaction Product of Tripropylene Glycol and Hexamethylene Diisocyanate In a suitable reaction vessel with water separator, 100 g of tripropylene glycol were introduced, after which nitrogen was passed over the material at 140° C. with stirring for 3 hours in order to eliminate traces of water. The system was then cooled to 40° C. and 5 g of HDI were added slowly dropwise with vigorous stirring. The temperature was maintained until the NCO value had fallen below 0.1%. Then the mass fraction of solids was adjusted to 85% using water. The reaction mixture was a pale yellow solution of low viscosity.

Auxiliary BE: Reaction Product of Glycerol and Hexamethylene Diisocyanate

In a suitable reaction vessel with water separator, 100 g of glycerol were introduced, after which the water was removed azeotropically at 140° C. for 5 hours using special boiling-point spirit 80/120 as azeotrope former. Following the removal of the azeotrope former (by distillation), the system was then cooled to 60° C. and 5 g of HDI were added slowly dropwise with vigorous stirring. The temperature was maintained until the NCO value had fallen below 0.1%. The reaction mixture was a yellow solution of medium viscosity.

Auxiliary BF: Reaction Product of Triethanolamine and Hexamethylene Diisocyanate In a suitable reaction vessel with water separator, 100 g of triethanolamine were introduced, after which the water was removed azeotropically at 140° C. for 5 hours using special boiling-point spirit 80/120 as azeotrope former. Following the removal of the azeotrope former, the system was then cooled to 40° C. and 15 g of HDI were added slowly dropwise with vigorous stirring. The temperature was maintained until the NCO value had fallen below 0.1%. The reaction mixture was a yellow solution of medium viscosity.

Performance Testing

The MF resin described above was used in each of the examples. The acrylic dispersion used was a dispersion based on a copolymer of methyl methacrylate, butyl acrylate, hydroxyethyl methacrylate, acrylic acid and styrene, having a hydroxyl number of about 120 mg/g and a mass fraction of solids of about 50%, which was diluted if necessary to the lower specified value (45%).

Inventive Examples 1–4 and Comparative Examples 1–4

130 g of 50% acrylic dispersion and 1.7 g of p-toluenesulfonic acid were added in each case to 100 g of the above-described MF resin, along with the auxiliaries indicated in Table 1 for the individual application examples. Following dilution to a liquor concentration of 50%, each of these liquors was used to impregnate papers having a mass per unit area of 200 g/m² (typical edgebanding cardboard) and the impregnated edgings were dried at 160° C. to a residual moisture content of about 2%. Following impregnation and drying, the basis weight was about 330 g/m². The impregnated edgings obtained in this way were coated with an aqueous acid-curing varnish (plasticized urea resin; combination of a urea resin with a short- to medium-oil alkyd resin, with p-toluenesulfonic acid as curing agent) and dried at a temperature of 160° C. to a residual moisture content of 1.5%. The varnish addon was about 20 g/m². With regard to their performance properties, each of the edgings obtained met the requirements.

To determine the formaldehyde emissions, the edging samples were conditioned for 3 days under standard climatic conditions (23° C., 50% relative atmospheric humidity) prior to each measurement. To determine the formaldehyde emissions under tropical climatic conditions, the edgings were stored for 1 to 4 weeks at 35° C. and 90% relative atmospheric humidity, after which they were reconditioned for 3 days under standard climatic conditions, prior to the actual measurement. The formaldehyde emissions were measured in accordance with EN 717-2. Table 1 lists the resulting formaldehyde emissions in mg/(h·m²) as averages of the 1- to 4-hour values:

TABLE 1

| | Auxiliary | Directly after prep. | After 1 wk | After 2 wks | After 4 wks | After 6 wks |
|---|---|---|---|---|---|---|
| Inventive Example 1 | 4 g BA | 1.7 | 4.5 | 3.8 | 3.6 | 3.3 |
| Inventive Example 2 | 12 g BA | 0.8 | 3.6 | 3.2 | 2.8 | 2.1 |
| Inventive Example 3 | 4 g BB | 1.4 | 3.9 | 3.4 | 2.5 | 2.3 |
| Inventive Example 4 | 12 g BB | 1.1 | 3.5 | 3.0 | 2.3 | 2.2 |
| Comp. Ex. 1 | — | 2.0 | 5.2 | 4.4 | 3.7 | 4.2 |
| Comp. Ex. 2 | 5 g urea | 1.9 | 5.1 | 4.2 | 4.1 | 4.0 |
| Comp. Ex. 3 | 12 g urea | 1.4 | 5.4 | 3.8 | 3.2 | 2.6 |
| Comp. Ex. 4 | 12 g glycerol | 1.6 | 4.6 | 3.7 | 3.4 | 2.5 |

The edgings produced in accordance with Inventive Examples 2 and 4 meet the E1 criterion (i.e., 3.6 mg/h/m²) even after one week of storage under tropical climate conditions.

Inventive Example 5 and Comparative Example 5

1.5 g of p-toluenesulfonic acid were added to 100 g of the above-described MF resin, along with the auxiliaries indicated in Table 2 for the individual application examples. These undiluted liquors were used to impregnate papers (typical edgebanding cardboard; 200 g/m²) by means of knife application from the decorative side, and the impregnated edgings were dried at 160° C. to a residual moisture content of about 1.5%. Thereafter, the basis weight was about 305 g/m². The impregnated edgings thus obtained were coated with an aqueous acid-curing varnish (see above) and dried at a temperature of 160° C. to a residual moisture content of 1.5%. The varnish addon was about 20 g/m². With regard to their performance properties, the edgings obtained in each case met the requirements.

The formaldehyde emissions (reported in mg/(h·m²) were determined as in Example 1.

TABLE 2

| | Auxiliary | Directly after prep. | After 1 wk | After 2 wks | After 4 wks | After 6 wks |
|---|---|---|---|---|---|---|
| Inventive Example 5 | 12 g BB | 1.0 | 2.2 | 2.1 | 1.8 | 1.8 |
| Comp. Ex. 5 | — | 1.0 | 3.3 | 2.4 | 2.9 | 2.9 |

Inventive Examples 6 and 7 and Comparative Examples 6 and 7

200 g of 50% acrylic dispersion and 1.7 g of p-toluenesulfonic acid were added to 100 g of the above-described MF resin, along with the amounts of auxiliaries indicated in Table 3 for the individual application examples and also PEG 400 (polyethylene glycol having a number-average molar mass $M_n$ of about 400 g/mol). Following dilution to a liquor concentration of 47% (mass fraction of the resins in the aqueous liquor), these resins were used to impregnate papers (typical edgebanding cardboard; mass per unit area about 200 g/m²) and the impregnated edgings were dried at 170° C. to a residual moisture content of about 1.6%. Following impregnation, the final weight was about 330 g/m². The impregnated edgings obtained in this way were coated with an aqueous acid-curing varnish (see above) and dried at a temperature of 160° C. for 60 seconds. The varnish addon was about 16 g/m². With regard to their performance properties, each of the edgings obtained met the requirements.

To determine the formaldehyde emissions, the edging samples were conditioned for 3 days under standard climatic conditions (23° C., 50% relative atmospheric humidity) prior to each measurement. To determine the formaldehyde emissions under tropical climatic conditions, the edgings were stored for 1 week at 35° C. and 90% relative atmospheric humidity, after which they were reconditioned for 3 days under standard climatic conditions, prior to the actual measurement. The formaldehyde emissions were measured in accordance with EN 717-2. Table 3 lists the resulting formaldehyde emissions in mg/(h·m²) as averages of the 1- to 4-hour values:

TABLE 3

| | Auxiliary as 100% substance | PEG 400 | Directly after prep. | After 1 week |
|---|---|---|---|---|
| Inventive Example 6 | 20 g BC | 20 g | 0.97 | 2.61 |
| Inventive Example 7 | 20 g BD | 20 g | 1.28 | 2.63 |
| Comp. Ex. 6 | — | 40 g | 1.52 | 3.49 |
| Comp. Ex. 7 | 20 g polypropylene glycol ($M_n$ < 400 g/mol) | 20 g | 1.82 | 2.93 |

Inventive Examples 8 and 9 and Comparative Examples 8 and 9

1.6 g of 45% acrylic dispersion and 1.0 g of p-toluenesulfonic acid were added to 100 g of the above-described MF resin, along with the auxiliaries indicated in Table 4 for the individual application examples. Following dilution to a liquor concentration of 75%, these liquors were used to impregnate papers (typical edgebanding cardboard; 200 g/m²) and the impregnated edgings were dried at 180° C. for 90 seconds. The final weight was about 335 g/m². With regard to their performance properties, the uncoated edgings obtained met the requirements.

To determine the formaldehyde emissions, the edging samples were conditioned for 3 days under standard climatic conditions (23° C., 50% relative atmospheric humidity) prior to each measurement. To determine the formaldehyde emissions under tropical climatic conditions, the edgings were stored for 1 week at 35° C. and 90% relative atmospheric humidity, after which they are reconditioned for 3 days under standard climatic conditions, prior to the actual measurement. The formaldehyde emissions were measured in accordance with EN 717-2. Table 4 lists the resulting formaldehyde emissions as averages of the 1- to 4-hour values. The flexibility of the edgings was assessed at room temperature with the aid of the flexural test. The parameter reported was the band radius at which the edging still just did not fracture. As is evident from Table 4, the formaldehyde emissions can be reduced significantly relative to Comparative Example 8 while retaining a very low band radius. The desired formaldehyde reduction cannot be achieved by adding small amounts of urea and sorbitol. Added at higher levels (Comparative Example 9a), there is a deterioration in the flexibility of the edging (larger band radius).

The table indicates the formaldehyde emission in mg/(h·m²) and the band radius in mm.

TABLE 4

| | Auxiliaxy as 100% substance | PEG 400 | Sorbitol | Urea | Directly after prep. | After 1 wk | Band radius |
|---|---|---|---|---|---|---|---|
| Inventive Example 8 | 9 g BC | 27 g | — | — | 0.64 | 1.57 | 5 |
| Inventive Example 9 | 9 g BC | 27 g | 1.1 g | 1.1 g | 0.49 | 1.51 | 5 |
| Comp. Ex. 8 | — | 36 g | — | — | 0.97 | 2.51 | 6 |
| Comp. Ex. 9 | — | 36 g | 1.1 g | 1.1 g | 0.80 | 2.22 | 5 |
| Comp. Ex. 9a | — | 36 g | 3.8 g | 3.8 g | — | — | 8 |

Inventive Examples 10 and 11 and Comparative Examples 10 and 11

1.7 g of 45% acrylic dispersion and 1.3 g of p-toluenesulfonic acid were added to 100 g of the above-described MF resin, along with the auxiliaries indicated in Table 5 for the individual application examples. Following dilution to a liquor concentration of 75%, these liquors were used to impregnate papers (typical edgebanding cardboard; 200 g/m²) and the impregnated edgings were dried at 180° C. for 90 seconds. The final weight was about 335 g/m². With regard to their performance properties, the uncoated edgings obtained met the requirements.

To determine the formaldehyde emissions, the edging samples were conditioned for 3 days under standard climatic conditions (23° C., 50% relative atmospheric humidity) prior to each measurement. To determine the formaldehyde emissions under tropical climatic conditions, the edgings were stored for 1 week at 35° C. and 90% relative atmospheric humidity, after which they were reconditioned for 3 days under standard climatic conditions, prior to the actual measurement. The formaldehyde emissions were measured in accordance with EN 717-2. Table 5 lists the resulting formaldehyde emissions as averages of the 1- to 4-hour values. The flexibility of the edgings was assessed at room temperature with the aid of the flexural test. The parameter reported was the band radius at which the edging still just did not fracture. As is evident from Table 5, the formaldehyde emissions can be reduced significantly relative to Comparative Example 10 while retaining a very low band radius. The desired formaldehyde reduction cannot be achieved by adding small amounts of urea and sorbitol (Comparative Example 11). The pot life is the time taken for the impregnating liquor, stored at 30° C., to obtain a viscosity (measured as the efflux time in accordance with DIN 53211 at 23° C.) of more than 60 seconds or for the penetration time with a defined test paper to rise to more than 70 seconds. The auxiliary BF has a considerable advantage as compared with the prior art, with regard to formaldehyde emissions and pot life.

TABLE 5

|  | Auxiliary 100% | PEG 400 | Sorbitol | Urea | Directly after prep. | After 1 wk | Pot life at 30° C. in h | Band radius in mm |
|---|---|---|---|---|---|---|---|---|
| Inventive Example 10 | 9g BE | 27 g | 1.1 g | 1.1 g | 0.46 | 1.47 | 8 | 6 to 8 |
| Inventive Example 11 | 9g BF | 27 g | 1.1 g | 1.1 g | 0.17 | 0.46 | >30 | 5 to 6 |
| Comp. Ex. 10 | — | 36 g | — | — | 0.75 | 1.98 | 6 | 5 to 6 |
| Comp. Ex. 11 | — | 36 g | 1.1 g | 1.1 g | 0.58 | 1.82 | 7 | 5 to 6 |

What is claimed is:

1. An aqueous amino resin composition comprising amino resins A, formaldehyde-binding additives (auxillaries) B, wherein the formaldehyde-binding auxillaries B are selected from the group consisting of mixtures B1 of organic amides B11 having up to 10 carbon atoms and from one to four nitrogen atoms, attached in amidelike or imidelike manner, and polyhydroxyl compounds B12 selected from the group consisting of aliphatic linear and branched compounds B121 having from 2 to 6 hydroxyl groups and 1 to 10 carbon atoms, monosaccharides B122 having up to 6 carbon atoms, and disaccharides B123 having up to 12 carbon atoms, and, if desired, water-soluble or water-dispersible, hydroxyl group-containing urethane compounds B13, if desired, acrylic resins C in the form of aqueous dispersions, and water, with the proviso that the presence of at least one of the components B13 and C in the composition is mandatory if the component B consists only of at least one organic hydroxyl compound which is soluble in water or in a monohydric alcohol having 1 to 4 carbon atoms, and which is selected from dihydric, trihydric and pentahydric alcohols containing up to 6 carbon atoms, pentaerythritol and sorbitol, monosaccharides containing up to 6 carbon atoms, disaccharides containing up to 12 carbon atoms, polysaccharides having an Ostwald viscosity of up to 200 mPa·s at 25° C. and a concentration corresponding to 37% refraction, monohydric and polyhydric aromatic alcohols containing only one benzene ring, and monohydric and polyhydric phenols, and of at least one amide which is soluble in water or a monohydric alcohol having 1 to 4 carbon atoms and which is selected from aliphatic amides containing up to 6 carbon atoms and aromatic amides containing only one benzene ring.

2. The aqueous amino resin composition as claimed in claim 1, wherein the amino resins A are water-soluble melamine resins, urea resins or melamine-urea cocondensates which are etherified with $C_1$ to $C_4$ alcohols.

3. The aqueous amino resin composition as claimed in claim 1, wherein the amino resins A are methanol-etherified melamine resins or melamine/urea resins having an amount-of-substance ratio (molar ratio) of melamine to urea to formaldehyde to methanol of 1 mol: (0 to 2 mol):(1.8 to 5.8 mol):(0.8 to 5.5 mol).

4. The aqueous amino resin composition as claimed in claim 1, wherein the ratio of the mass of component B to the mass of the amino resin A in the mixture is from 1 to 30:100.

5. The aqueous amino resin composition as claimed in claim 1, wherein the urethane compounds B13 are of low molar mass, having a number-average molar mass $M_n$ of from 150 to 5000 g/mol, and contain hydrophilic groups.

6. The aqueous amino resin composition as claimed in claim 1, wherein formaldehyde-binding auxillaries B used comprise the components B2, which are obtainable by reacting polyhydroxyl compounds B21 selected from aliphatic linear and branched compounds B121 having from 2 to 6 hydroxyl groups and 1 to 10 carbon atoms, monosaccharides B122 having up to 6 carbon atoms, and disaccharides B123 having up to 12 carbon atoms, and also aliphatic aliphatic polyhydroxy amines B211 having from 2 to 6 hydroxyl groups and 1 to 4 nitrogen atoms, attached in an aminelike manner, per molecule, and containing no free amine-type hydrogen atoms, with monofunctional or polyfunctional aliphatic, cycloaliphatic or aromatic isocyanates B22.

7. The aqueous amino resin composition as claimed in claim 1, wherein the acrylic resins C are aqueous dispersions of an acrylic copolymer in water, the parent monomer mixture containing more than 50% of its mass of acrylic monomers selected from acrylic acid and methacrylic acid, their esters with aliphatic alcohols having 1 to 10 carbon atoms, their esters with aliphatic polyhydroxy compounds having 2 to 10 carbon atoms and at least two hydroxyl groups per molecule, and the nitriles of said acids.

8. The aqueous amino resin composition as claimed in claim 7, wherein the ratio of the mass of the acrylic copolymer to the mass of the amino resin in the mixture is from 0 to 150:100.

9. A method of use of the aqueous amino resin composition as claimed in claim 1 for comprising impregnating paper or cardboard with the said aqueous amino resin composition for use as finished foils or edgings.

10. A finished foil or edging comprising cardboard or paper impregnated with the aqueous amino resin composition as claimed in claim 1.

11. The finished foil or edging as claimed in claim 10, wherein the mass per unit area of the paper or cardboard following impregnation and subsequent drying is greater by a factor of from 1.3 to 2.5 than that of the substrate that is used.

* * * * *

UNITED STATES PATENT AND TRADEMARK OFFICE
CERTIFICATE OF CORRECTION

PATENT NO.     : 6,762,222 B2  Page 1 of 1
DATED          : July 13, 2004
INVENTOR(S)    : Frank Scholl et al.

It is certified that error appears in the above-identified patent and that said Letters Patent is hereby corrected as shown below:

Title page,
Item [54], Title, should read -- AMINO RESIN MIXTURE FOR PRODUCING FOILS AND EDGINGS WITH REDUCED FORMALDEHYDE ELIMINATION --.

Column 11,
Line 11, before "comprising" delete -- for --.

Signed and Sealed this

Twenty-third Day of November, 2004

JON W. DUDAS
*Director of the United States Patent and Trademark Office*